Aug. 20, 1946.  P. C. ROCHE  2,406,256
MOUNTING
Filed March 20, 1944  3 Sheets-Sheet 1
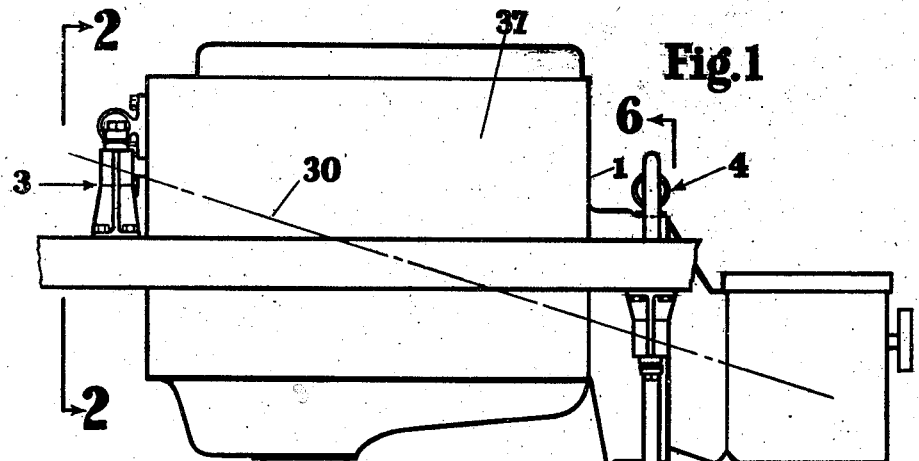
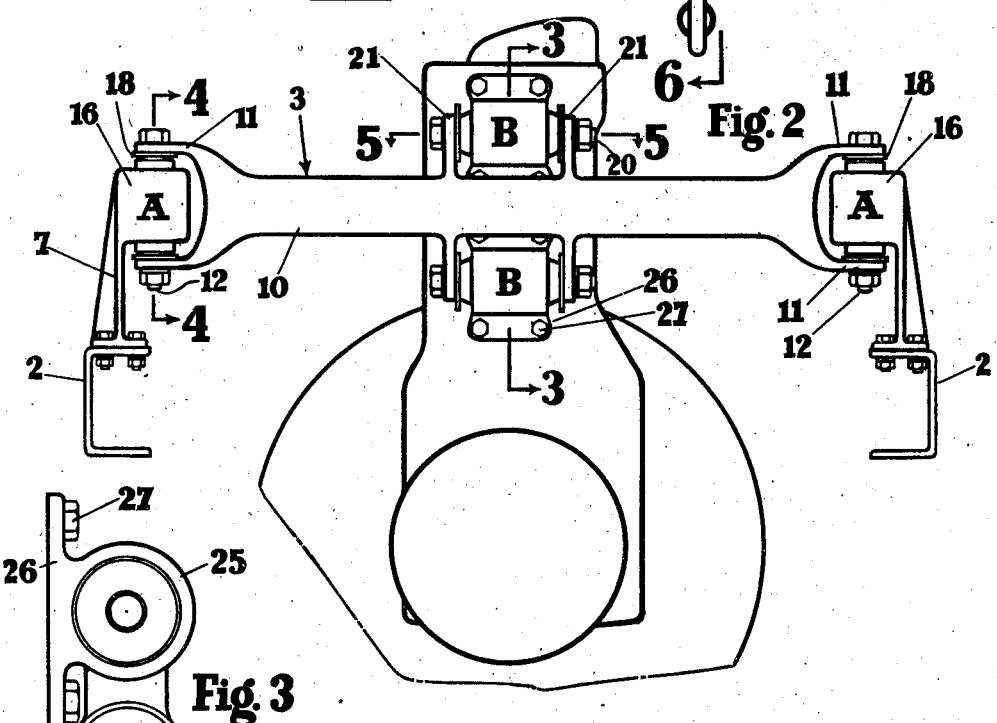
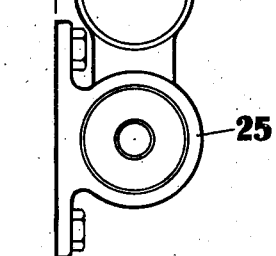
Paul C. Roche
Inventor
By
Attorney

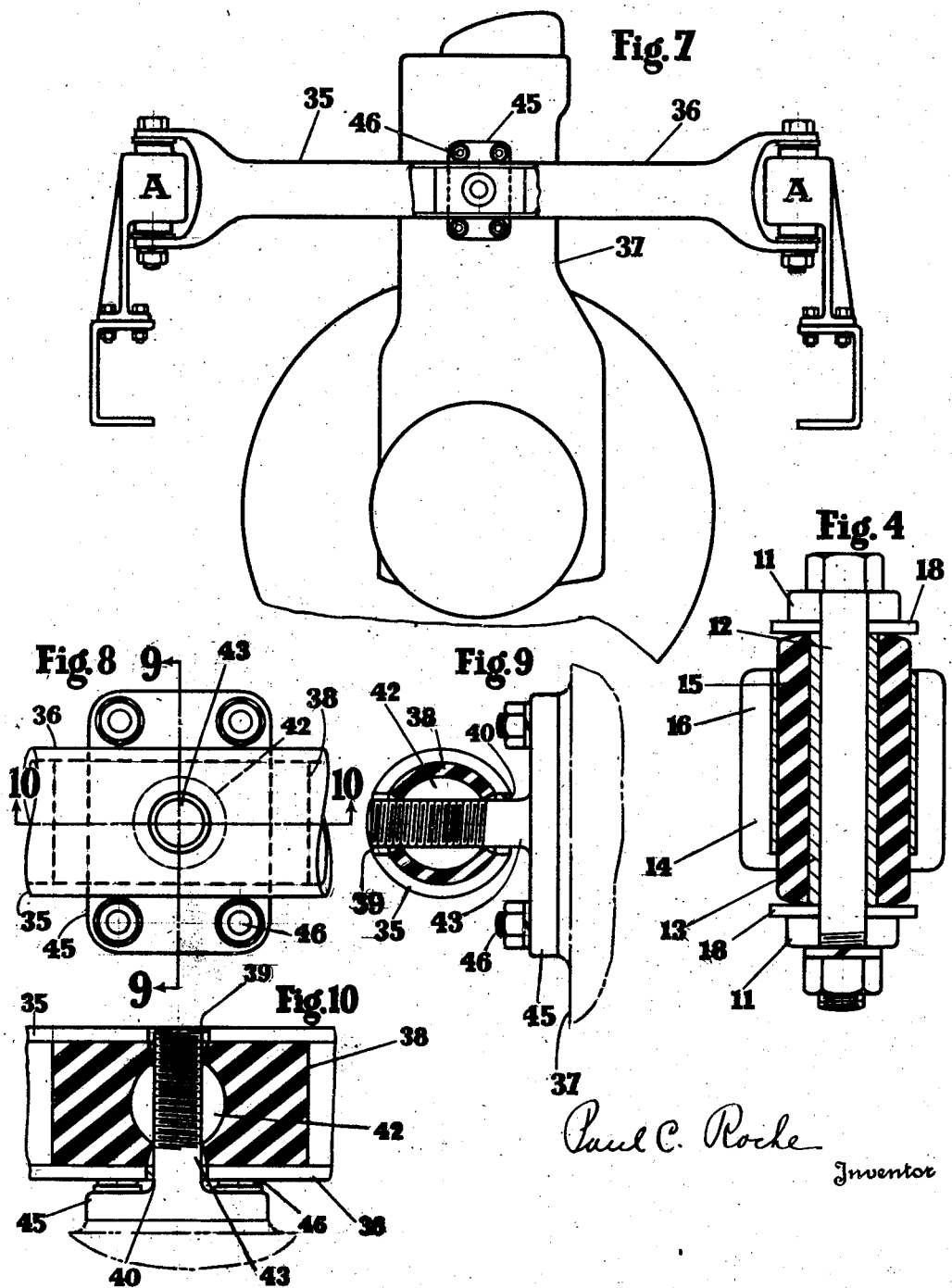

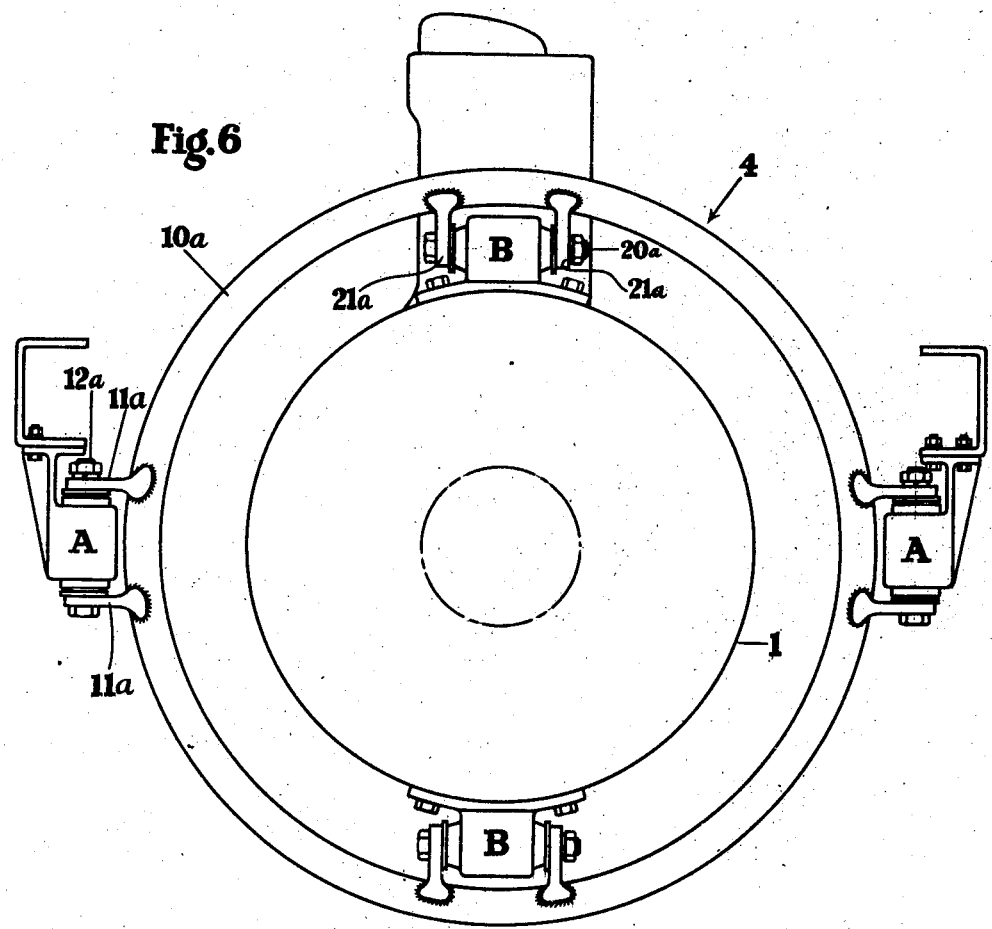
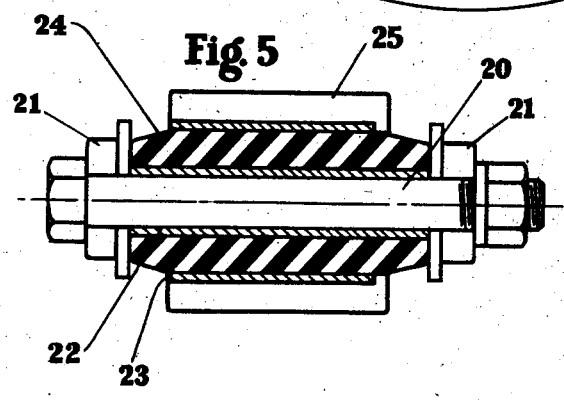

Patented Aug. 20, 1946

2,406,256

UNITED STATES PATENT OFFICE 2,406,256

MOUNTING

Paul C. Roche, Erie, Pa., assignor to Lord Manufacturing Company, Erie, Pa., a corporation of Pennsylvania Application March 20, 1944, Serial No. 527,289

8 Claims. (Cl. 248—9)

The invention relates to mountings for isolating vibrations of a supported member from a supporting member, and for dampening other relative movements between them, and has particularly to do with mountings for supporting internal combustion engines of the in-line type by the frames of automobiles or by other structures. It will be explained with reference to its applicability to the mounting of such engines.

An in-line automobile engine is subjected primarily to vertical translational vibrations, to horizontal translational vibrations in directions transverse to the engine, and to torque vibrations around a torque axis somewhat inclined from the horizontal extending longitudinally of the engine. This invention provides a resilient mounting for an engine which affords adequate softness in these three directions effectively to isolate all such engine vibrations and at the same time preserves stability of the engine under shocks such as those incident to traveling on rough roads. More specifically, it provides an engine mounting comprising bodies of resilient material, such as rubber, arranged in series and so formed that, considering two of such bodies, one sustains vertical translational vibrations in shear and the other sustains them chiefly in compression stress, that the second-mentioned body sustains horizontal transverse translational vibrations in shear and the first-mentioned body sustains them chiefly in compression stress, and that both bodies sustain torsional vibrations in shear.

The invention is illustrated in the accompanying drawings in which Fig. 1 is a somewhat diagrammatic side elevation of an in-line engine supported by side frames of an automobile; Fig. 2 a left end elevation to enlarged scale taken on the line 2—2, Fig. 1; Figs. 3, 4, and 5 detailed sectional views of mountings taken on the lines 3—3, 4—4, and 5—5, respectively, of Fig. 2; Fig. 6 a right end elevation taken on the line 6—6, Fig. 1; Fig. 7 a view corresponding to Fig. 2 showing a modification of construction; Fig. 8 an enlarged face view of the central portion of Fig. 7; and Figs. 9 and 10 vertical and horizontal sectional views taken on the lines 9—9 and 10—10, respectively, of Fig. 8.

In the embodiment of the invention shown in Fig. 1, an in-line engine 1 is supported by automobile side frames 2 through mounting structures 3 and 4, the former engaging the timing gear end of the engine housing and the latter engaging the fly-wheel housing. Although these two mounting structures differ in form, they each function alike as will appear from the following descriptions of them.

As seen in Fig. 2, the mounting structure 3 comprises an elongate rigid frame 10 in the form of a metal tube provided at each end with a yoke 11 whose upper and lower tines engage the central pin 12 of a tube form resilient mounting which is shown in vertical central section in Fig. 4, each of which mountings as a whole is marked A. Surrounding pin 12 there is an inner metal sleeve 13, and concentric therewith an outer metal sleeve 14 which is somewhat shorter in length than sleeve 13. To the outer face of sleeve 13 and the inner face of sleeve 14 there is bonded a cylindrical body 15 of resilient material, such as rubber. The outer sleeve is engaged by a cylindrical bushing 16 formed at the upper end of a bracket 7 whose lower end is connected to side frame 2. Between each end of the resilient body 15 and the inside face of each yoke tine 11 there is a rigid washer 18 from which the ends of resilient body 15 diverge slightly outwardly for snubbing action to give the mounting stability against road shocks.

Similarly, tube form mountings are connected to the top and bottom of the central portion of frame 10, each of which is shown in horizontal section in Fig. 5 and is marked B. Each comprises a central horizontal pin 20 supported by a pair of vertical lugs 21 attached to frame 10, and inner and outer sleeves 22 and 23 to the opposed faces of which there is bonded a cylindrical body 24 of resilient material such as rubber. Outer sleeve 23 is engaged by a horizontally disposed cylindrical bushing 25 which forms part of a bracket 26 for attachment by bolts 27 to the forward or timing gear end of the engine housing. Because road shocks are normally in vertical directions the B mountings need not be formed for snubbing action.

Mounting structure 4 which surrounds and is attached to the fly-wheel housing of the engine differs from mounting structure 3 in that for mounting structure 4 the rigid frame that extends from one to the other supports at the side of the engine is in the form of a metal tube 10a. Each of its sides is provided with laterally extending lugs 11a which engage the ends of a vertical pin 12a forming part of a resilient mounting the same as the A mountings shown in the ends of frame 10 in Fig. 2. Similarly, at its top and at its bottom frame 10a is provided with a pair of lugs 21a which engage the ends of a horizontal pin 20a of a tube form mounting the same as the B mountings shown in Fig. 2. As shown in Fig. 1 mounting structures 3 and 4 at the ends of the engine are so positioned that the engine torque axis 30, which passes approximately through the center of gravity of the engine, also passes through the central transverse axis of each of these structures. If desired, a mounting structure 3 such as that at the forward end of the engine may be used to support its rear end by connecting the structure to the transmission housing at the right of and below the mounting structure 4 as seen in Fig. 1.

When the engine is running its horizontal transverse translational vibrations are transmitted first to the horizontally disposed tube form B mountings by which such vibrations are sustained and largely isolated through shear on the rubber which has low axial stiffness. To the extent that such horizontal vibrations may not be thus fully isolated they are transmitted to and sustained chiefly by compression stress of the rubber in the A mountings, which have high radial stiffness. In a similar but reverse manner, vertical translational vibrations of the engine are first sustained chiefly by compression stress of the rubber in the B mountings and are transmitted through frames 10 and 10a to the A mountings at the end of these frames in which such vibrations are isolated by shear stress of the rubber. The mountings being thus arranged in series, provision is thereby made in each mounting structure 3 and 4 to isolate both transverse horizontal and vertical translational vibrations principally by shear stress of the bodies or resilient material in separate mountings, and this is accomplished without sacrificing desirable stability with respect to road shocks. Torsional vibrations around the torque axis 39 of the engine, and which normally contribute much to vibrational roughness, are isolated by shear stress of the rubber of all of the A and B mountings which thus function in series.

The mounting structure 35 shown in Figs. 7–10 is like mounting structure 3 shown particularly in Fig. 2 in that mounting structure 35 comprises an elongate rigid frame 36 in the form of a metal tube provided at each end with a yoke which engages a vertically disposed A mounting the same as shown in detail in Fig. 4 and described above. In place of using two horizontally disposed B mountings for connecting the central portion of frame 2 to an engine 37, a single resilient mounting of the form shown in Figs. 8, 9 and 10 is used. Such mounting comprises a cylindrical body 38 of resilient material such as rubber bonded to the interior face of frame 36 whose walls are provided with diametrically opposed openings 39 and 40. In the center of rubber body 38, there is a metal sphere 42, whose surface is bonded to the rubber and which is provided centrally with a threaded opening to receive the threaded end of a pin 43 that forms part of a bracket 45 adapted to be attached to the engine housing by bolts 46.

Vertical translational vibrations of the engine are transmitted through pin 43 and sphere 42 to the portion of rubber body 38 above and below sphere 42 as viewed in Fig. 9, and are sustained chiefly by compression stress on such portions of the rubber in a manner similar to the action of the B mountings. Horizontal transverse translational vibrations are transmitted from sphere 42 to rubber body 38, and are isolated chiefly by shear stress of the portions thereof that are at the right and left of sphere 42 as view in Fig. 10. Torsional vibrations are sustained through shear stress of the rubber body 38 in a manner similar to that just explained with reference to horizontal vibrations, the A mounting at the ends of frame 36 acting in series with that at the center of the frame 36 in isolating torsional vibrations.

What I claim as new is:

1. The combination with an engine and a support at each side thereof, of a rigid frame extending from one to the other of said supports and connected thereto and to the engine by mountings each comprising a body of resilient material such as rubber having spaced attaching surfaces capable of relative movement along and toward each other and respectively stressing the material by such movement in shear and in compression, the mountings connecting the frame to said supports being arranged to sustain vertical translational vibrations in shear and horizontal transverse vibrations principally in compression stress of said material, the mountings connecting said frame to the engine being arranged to sustain vertical vibrations principally in compression and horizontal transverse vibrations in shear stress of said material, and all of said mountings being positioned to sustain torque vibrations around the torque axis of the engine in shear stress of said material.

2. The combination with an engine and a support at each side thereof, of a rigid elongated frame extending from one to the other of said supports and being connected thereto and to the engine by pairs of mountings, each mounting being of tube form comprising a cylindrical body of resilient material such as rubber, the pair of mountings connecting the frame to said support being attached to the ends of the frame and adapted to sustain vertical translational vibrations in shear and horizontal transverse vibrations principally in compression stress of said material, the pair of mountings connecting said frame to the engine being attached to the frame above and below its central portion and adapted to sustain vertical vibrations principally in compression and horizontal transverse vibrations in shear stress of said material, and all of said mountings sustaining torque vibrations around the torque axis of the engine in shear stress of said material.

3. The combination with an engine and a support at each side thereof, of a rigid substantially circular frame having its side portions extending from one to the other of said supports and being connected thereto and to the engine by pairs of mountings, each mounting being of tube form comprising a cylindrical body of resilient material such as rubber, the pair of mountings connecting the frame to said supports being attached to the side portions of the frame and adapted to sustain vertical translational vibrations in shear and horizontal transverse vibrations principally in compression stress of said material, the pair of mountings connecting said frame to the engine being attached to the upper and lower portions of the frame and adapted to sustain vertical vibrations principally in compression and horizontal transverse vibrations in shear stress of said material, and all of said mountings sustaining torque vibrations around the torque axis of the engine in shear stress of said material.

4. The combination with a structure subjected to vibrations in two directions substantially at right angles to each other, and a support therefor, of a mounting connecting the structure to the support comprising a rigid tubular member having its side wall provided with an opening, a body of resilient material such as rubber bonded to the inner surface of said member and extending on both sides of said opening, and a connecting pin extending substantially at right angles to the axis of said tubular member through said wall opening thereof and provided within said member with a rigid head embedded in and having its outer surface bonded to said resilient material, there being a space between said head and the inner surface of said tubular member filled with said resilient material, whereby vibrations in a direction parallel to the axis of said tubular member are sustained in shear stress of said resilient material and vibrations at right angles thereto are sustained principally by compression stress thereof.

5. The combination with a structure subjected to vibrations in two directions substantially at right angles to each other, and a support therefor, of a mounting connecting the structure to the support comprising a rigid tube having its side wall provided with an opening, a body of resilient material such as rubber bonded to the inner surface of said tube and extending on both sides of said opening, and a connecting pin extending substantially at right angles to the axis of said tube through said wall opening thereof and provided within said tube with a rigid spherical head embedded in and having its outer surface bonded to said resilient material, there being a space between said head and the inner surface of said tube filled with said resilient material, whereby vibrations in a direction parallel to the axis of said tube are sustained in shear stress of said resilient material and vibrations at right angles thereto are sustained principally by compression stress thereof.

6. The combination with an engine and a support at each side thereof, of a rigid tube extending from one to the other of said supports and having its ends connected thereto by tube form mountings each comprising a cylindrical body of resilient material such as rubber adapted to sustain vertical translational vibrations in shear and horizontal vibrations principally in compression stress of said material, the central portion of the side wall of said tube being provided with an opening, a body of resilient material such as rubber bonded to the inner surface of said tube and extending on both sides of said opening, and a pin attached to said engine and extending substantially at right angles to the axis of said tube through said wall opening thereof and provided within said tube with a rigid head embedded in and having its outer surface bonded to said resilient material, there being a space between said head and the inner surface of said tube filled with said resilient material.

7. The combination with a structure subjected to torsional vibrations and to translational vibrations in two directions substantially perpendicular to each other, and a support, of an intermediate frame, mountings connecting the frame to the structure and the frame to the support, each comprising a body of resilient material such as rubber between attaching surfaces normal to a radius through the axis of torque vibration, the attaching surfaces for the structure being normal to one direction of translational vibration and the attaching surfaces for the support being normal to the other direction of translational vibration.

8. The combination with a structure subjected to torsional vibrations and to translational vibrations in two directions substantially perpendicular to each other, and a support, of an intermediate frame, mountings connecting the frame to the structure and the frame to the support, each being soft along an axis perpendicular to a radius through the axis of torque vibration and stiff along axes parallel and perpendicular to the torque axis, the mountings connecting the frame and structure being arranged with their soft axes along one direction of translational vibration and the mountings connecting the frame and support being arranged with their soft axes along the other direction of translational vibration.

PAUL C. ROCHE.